(12) United States Patent
Danebergs et al.

(10) Patent No.: US 11,643,278 B2
(45) Date of Patent: May 9, 2023

(54) SCREW FORWARDING DEVICE FOR A SCREW FEEDER

(71) Applicant: ATLAS COPCO INDUSTRIAL TECHNIQUE AB, Stockholm (SE)

(72) Inventors: Andris Danebergs, Svärdsjö (SE); Stone Li, Jiangshu (CN); Michael Wueste, Wesel (DE)

(73) Assignee: Atlas Copco Industrial Technique AB, Stockholm (SE)

( * ) Notice: Subject to any disclaimer, the term of this patent is extended or adjusted under 35 U.S.C. 154(b) by 0 days.

(21) Appl. No.: 17/863,466

(22) Filed: Jul. 13, 2022

(65) Prior Publication Data

US 2022/0340367 A1 Oct. 27, 2022

Related U.S. Application Data

(63) Continuation of application No. PCT/EP2021/050612, filed on Jan. 14, 2021.

(30) Foreign Application Priority Data

Jan. 17, 2020 (SE) .................................... 2030014-1

(51) Int. Cl.
*B65G 27/08* (2006.01)
*B65G 47/14* (2006.01)

(52) U.S. Cl.
CPC ......... *B65G 27/08* (2013.01); *B65G 47/1471* (2013.01)

(58) Field of Classification Search
None
See application file for complete search history.

(56) References Cited

U.S. PATENT DOCUMENTS 1,842,911 A * 1/1932 Manierre ............... B65G 67/08
198/584
4,407,402 A * 10/1983 Nishimura ......... B65G 47/1478
198/396

(Continued)

FOREIGN PATENT DOCUMENTS

CN 107032095 A 8/2017
CN 109230381 A 1/2019

OTHER PUBLICATIONS

International Search Report issued by the European Patent Office acting as the International Searching Authority in relation to International Application No. PCT/EP2021/050612 dated Apr. 19, 2021 (4 pages).

(Continued)

*Primary Examiner* — William R Harp
(74) *Attorney, Agent, or Firm* — Robert P. Michal, Esq.; Carter, DeLuca & Farrell LLP

(57) ABSTRACT

A screw forwarding device for a screw feeder includes a base plate, a vibration mechanism including at least one spring and a vibration motor connected to the at least one spring, and a rail for receiving screws. The rail is connected to a first end of the at least one spring and the at least one spring is arranged at an oblique angle to the rail. The screw forwarding device further includes a fastening mechanism for rigidly connecting a second end of the at least one spring to the base plate, whereby a movement path of the vibration mechanism, during a use of the screw forwarding device, defines a plane of movement. The base plate is oriented substantially parallel to the plane of movement defined by the vibration mechanism.

21 Claims, 2 Drawing Sheets

(56) References Cited

U.S. PATENT DOCUMENTS 4,684,010 A * 8/1987 Hutter .................... B65G 27/02
267/141
5,702,030 A * 12/1997 Hulscher ............ B65G 47/1478
221/254

OTHER PUBLICATIONS

Written Opinion of the International Searching Authority issued by the European Patent Office acting as the International Searching Authority in relation to International Application No. PCT/EP2021/050612 dated Apr. 19, 2021 (6 pages).

International Preliminary Report on Patentability issued by the European Patent Office acting as the International Searching Authority in relation to International Application No. PCT/EP2021/050612 dated Apr. 29, 2022 (11 pages).

* cited by examiner

SCREW FORWARDING DEVICE FOR A SCREW FEEDER

CROSS-REFERENCE TO RELATED APPLICATIONS

This application is a continuation of PCT International Application No. PCT/EP2021/050612 filed Jan. 14, 2021, which claims priority to Swedish Patent Application No. 2030014-1, filed Jan. 17, 2020, the disclosure of each of these applications is expressly incorporated herein by reference in their entirety.

TECHNICAL FIELD

The invention relates to the field of screw feeders and in particular to the field of vibration forwarding devices that use a rail to forward screws to a separator. The screws are thereby fed one by one via the rail to the separator, which then forwards each screw in a pre-defined way and position, for example in a thread-first position of the screw or alternatively in a head first position of the screw to a machine or tool using the screw.

BACKGROUND OF THE INVENTION

Screw feeders typically comprise a step-feeder, a bowl feeder or other type of feeder, which collect and lift screws up on a first end of a vibration plate, the vibration plate typically comprises a rail towards a second end of the vibration plate. The rail conveys the now assorted and correctly oriented screws towards a separator unit or the like that picks the screws one after the other and forwards them directly to a tightener or other machine. Typically, the forwarding of the correctly oriented screws is done via air pressure in a hose so that the screws travel in the hose thrusted by the air pressure and therewith in a pneumatic way. If a screw is not correctly aligned a blowing device is used to blow the screw back into a reservoir or container from which the screw will be picked up again by the step feeder.

The step feeder or step feeder unit, the vibration plate together with the rail, thus the vibration unit, and the separator unit are all mounted on a horizontally arranged base plate. Due the height of the reservoir and the entire step feeder, the vibration unit stands typically on a rather high pedestal. The pedestal typically consists of rather light material and structure, which leads to the problem that it is neither heavy enough nor stiff enough to dampen vibrations.

Another problem is that the pedestal positions the vibration unit comparably far away from the base plate which enhances the risk of resonance and/or amplification of the vibrations. This leads to the use of additional mass and/or rubber cushions for dampening the vibrations. Although the mass of the pedestal is usually in close proximity to the vibration unit or vibration motor, its own mass is typically not enough to dampen vibration. That is the reason why additional mass and/or dampers are added. In cases when the vibration motor is run under high load and/or when comparably heavy fasteners are transported on the rail, then the likelihood of resonance is rather high.

This leads to the need of rubber cushions that are mounted between the pedestal and the vibration unit in order to avoid that the vibration is transferred to the base plate and therewith to the other components, such as the step feeder unit and the separator unit. These rubber cushions or absorbers require that the separator unit and, in some cases even the step feeder unit, have to be mounted on adjustable pedestals in order to make sure that the exact tolerances required by the screw feeder and the other components can be met. There must be a certain amount of room between the components and units, respectively, in order to allow movement so that the vibrating parts do not come into contact with the stationary parts. In addition these rubber cushions or absorbers need to be replaced at regular time intervals, which means that the entire screw feeder line including the tool, which uses the screws, has to stand still.

In some cases a mass is placed close to (in connection with the non-vibrating portion of the vibration unit) the vibration unit in order to counteract the vibration so that the rubber cushions do not have to absorb the entire vibration.

The dampening of the vibration of the vibration unit via the rubber cushions may further lead to resonance in the pedestal and therewith in the entire screw feeder, which leads to problems with tolerances and potentially interferences between the vibrating—and non-vibrating components. Resonance can in particular occur when the rubber cushions or dampening elements are close to be worn out. This resonance or resonance effects can lead to noise and premature failure of components and the main reason why additional mass is added or why rubber cushions are installed is due to the fact that resonance wants to be avoided. Resonance is not wanted at all, since it can disturb the entire screw feeder and therewith lead to downtimes, as explained above. The typical methods used to cancel resonance effects are either using rubber cushions for the instalment of the vibration unit or the use of a comparably large mass that cannot be excited by the vibration unit.

The high tolerances are in particular also required due to the separator unit, that picks the screws, ono-by-one, from the rail. Too large gaps or joints or changes in these gaps or joints can lead to disturbances when the screws are forwarded by the separator unit. Small changes in these gaps can disturb the entire screw feeder. The use of rubber cushions will lead to bigger gaps since the movement of the vibration gets larger due to the flexibility of such rubber cushions. Wear and deformation of the rubber cushions will again to lead to a need for even larger gaps and make the alignment between the rail and the separator even more difficult.

CN107032095 discloses a build-up and design of a screw feeder with components mounted on a horizontal base plate. The vibrator (23) illustrated in FIG. 13 of CN107032095 is shown to be mounted on rubber cushions in order to absorb the vibration towards the base plate so that a screw feeder unit and a separator unit are not affected by the vibration. CN107032095 still discloses a device where rubber cushions need to be used in order to avoid that the vibration and potential resonance vibration is transferred to the entire screw feeder thereby disturbing other components of the screw feeder.

SUMMARY OF THE INVENTION

An object of the present invention is to provide a screw forwarding device for a screw feeder, which is reliable and durable.

Another object of the present invention is to provide a screw forwarding device for a screw feeder, which is easy to assemble.

The inventors of the present invention have realized that it is possible to avoid the dampening elements or absorbers in the form of rubber cushions by placing the vibration unit and the base plate in a smart way. Instead of placing the base plate horizontal and instead of placing the vibration unit on a high pedestal onto the horizontal base plate, they realized that placing the vibration unit close to a comparably heavy base plate and rigidly connecting the vibration unit to the base plate leads to a better behavior of the vibration unit and to the advantage that dampening elements such as rubber cushions, can be avoided. In order to do that the base plate is positioned substantially parallel to a plane of movement, which plane of movement is defined by the movement path of the vibration unit. In many cases this movement path is arranged in at least more or less parallel to a vertical plane. Such a positioning of the base plate allows a rather short distance between the vibration unit and the base plate and no pedestal is required. In addition, by choosing a proportion between a first mass of the vibration unit and a second mass of the base plate in predefined way, the vibration that is transferred from the vibration unit to the base plate can be further reduced. Each of the above proposed solutions lead to an improved design so that dampening elements are not required.

Disclosed herein is a screw forwarding device for a screw feeder comprising a base plate, a vibration mechanism comprising at least one spring and a vibration motor connected to the at least one spring and a rail for receiving screws. The rail is connected to a first end of the at least one spring, the at least one spring is arranged at an oblique angle to the rail. The screw forwarding device comprises further a fastening mechanism for rigidly connecting a second end of the at least one spring to the base plate, whereby a movement path of the vibration mechanism, during a use of the screw forwarding device, defines a plane of movement, in which plane of movement the vibration mechanism is moving. The base plate is oriented substantially parallel to the plane of movement defined by the vibration mechanism.

The above meaning of the word "substantially" is that a delta of the angle between the orientation of the plane of movement and the orientation of the base plate should be less than 15° preferably less than 10° and more preferably less than 5°. In the ideal case the plane of movement and the base plate are parallel, which means there is an angle of 0° between them.

The vibration mechanism is configured to move in the plane of movement during use in order to forward-vibrate the screws into and along the rail. The vibration mechanism consists of the vibrating part, thus the vibration motor connected to the rail, and a stationary part connected to the baseplate. In the present case the amount of vibration is more less the same (equal) in both elements, the vibrating part and the stationary part, but due to the close arrangement of the base plate the vibration on the stationary part or side is absorbed via the base plate. In prior art solutions the stationary vibration is in some cases cancelled by a built in mass that moves phase shifted to the vibration of the vibrating part in order to cancel the vibration.

The rail may also be a groove.

The oblique angle may be in the range of 5° to 45°, preferably 5° to 30° and more preferably 5° to 25°.

The rail may be arranged at an angle to a horizontal plane or it may be parallel to the horizontal plane. If the rail is arranged angled the angle is typically around 5°, such as 1° to 15° or 4 to 12° or 5° to 10°. As mentioned, it can also be 0° and being parallel to a horizontal plane.

The screw forwarding device may be called a vibration unit.

The plane of movement is defined by a circular, an oval or a round-rectangular moving pattern of the vibration mechanism.

An advantage of the above is that the vibration mechanism can be arranged close to the base plate, which avoids the use of dampening elements or rubber cushions. The base plate actually itself acts as a mass that is large enough to not be excited by the vibrations coming from the vibration unit/vibration motor.

In an embodiment a shortest distance when measured between the base plate and the vibration mechanism is from 0 to 5 cm, preferably from 0 to 3 cm and more preferably less than 2 cm.

A gauge may be used to mount the vibration mechanism onto the base plate. The gauge can easily be used because the surface machined surface of the base plate, which is preferably perfectly flat, can be used as a reference surface. When preparing the base plate a drilling template or scheme may be used in order to make sure that the various components can be mounted accurately.

The vibration mechanism may have a first mass and the base plate may have a second mass and the relation between the first mass and the second mass may be from 1:6 to 1:15, preferably from 1:7 to 1:12 and more preferably from 1:8 to 1:10.

The proportion of the (first) mass of the vibration mechanism and the (second) mass of the base plate may further reduce or even eliminate the vibration that is transferred from the vibration mechanism to the base plate.

In an embodiment the second mass of the base plate may be from 5 kg to 15 kg, preferably from 7 kg to 13 kg and more preferably from 8 kg to 10 kg. Larger screw feeders may even have a base plate with mass more than 15 kg.

The first mass of the vibration mechanism and the second mass of the base plate may depend on the type and size of screws that have to be conveyed by the vibration unit or screw forwarding device.

In an embodiment the plane of movement and/or the base plate may be oriented substantially vertical.

The word "substantially" in the above has the same meaning as previously explained.

In an embodiment the spring may be a plate spring.

In a further embodiment the screw forwarding device may comprise at least two springs, which may be plate springs, a bridge and a foundation, wherein the bridge is interconnecting the two springs at their respective first ends and wherein the foundation is interconnecting the two springs at their respective second ends, wherein the vibration motor is connected to any of the bridge or the two springs.

In an embodiment the screw forwarding device may comprise a fastening mechanism for connecting the vibration mechanism to the base plate.

In another embodiment the base plate may comprise pre-drilled holes and the fastening mechanism comprises bolts, screws and nuts for screwing the vibration mechanism to the base plate.

Advantageously the fastening mechanism allows to fix the vibration mechanism in a rigid and stable manner to the base plate.

The base plate may comprise cantilever arms at a bottom so that the base plate is standing in a stable and steady way on the ground or a working table or bench.

The other components of the screw feeder, such as the step feeder unit and the separator unit may also be connected to the base plate.

BRIEF DESCRIPTION OF THE DRAWINGS

The present invention will now be described, for exemplary purposes, in more detail by way of an embodiment(s) and with reference to the enclosed drawings, in which.

DETAILED DESCRIPTION

Figure 1:
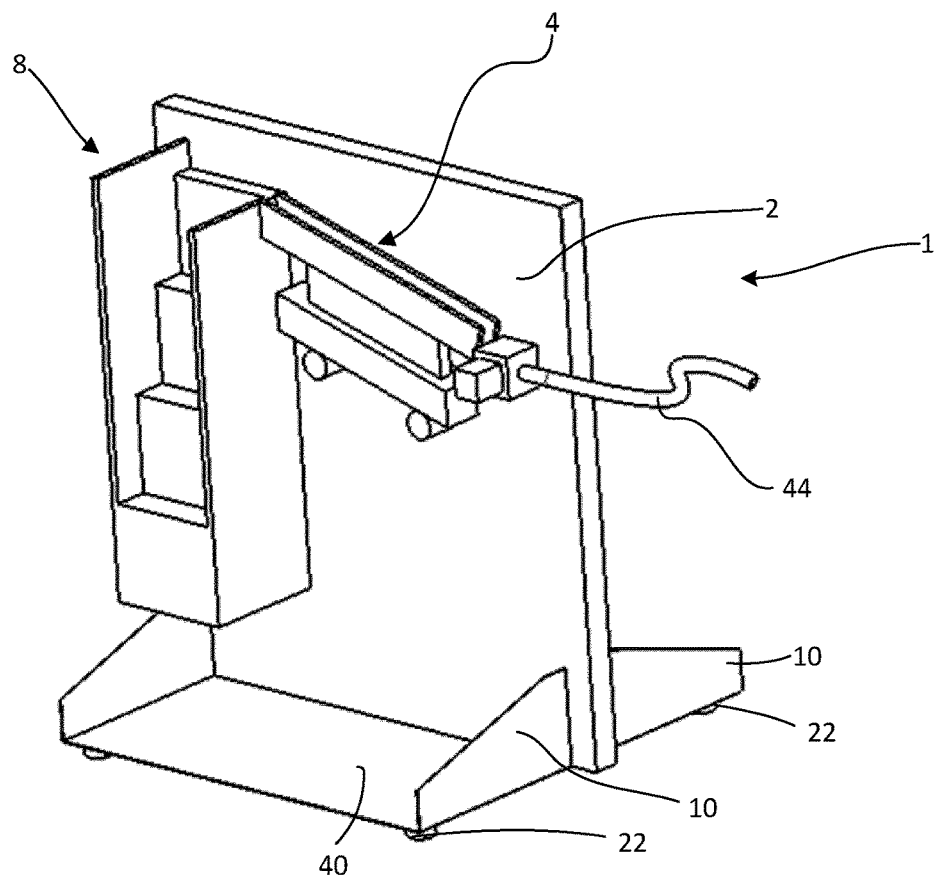
FIG. 1 schematically illustrates a perspective view of a screw feeder comprising a screw forwarding device according to the invention.

The figures illustrate an embodiment of a screw feeder 1 comprising a base plate 2 and, mounted to the base plate 2, a step feeder unit (8), a screw forwarding device 4 or vibration unit and a separator unit 6.

The base plate 2 comprises at least four cantilever arms 10, which extend horizontally or at an angle of more or less 90° from a lower end of the base plate 2. Two cantilever arms 10 extend from each side of the lower end or bottom of the base plate 2. The cantilever arms 10 may comprise feet 22.

Alternatively to the cantilever arms 10 a foundation plate 40 arranged orthogonal to the base plate 2 may be used. In the illustration in FIGS. 1 to 4 a combination of cantilever arms 10 and a foundation plate 40 is illustrated, whereby the feet 22 are arranged close to corners at a bottom of the foundation plate 40. It is however clear that either only a foundation plate 40 with feet 22 or only cantilever arms 10 with feet 22 at their respective free ends can also be used.

Figure 2:
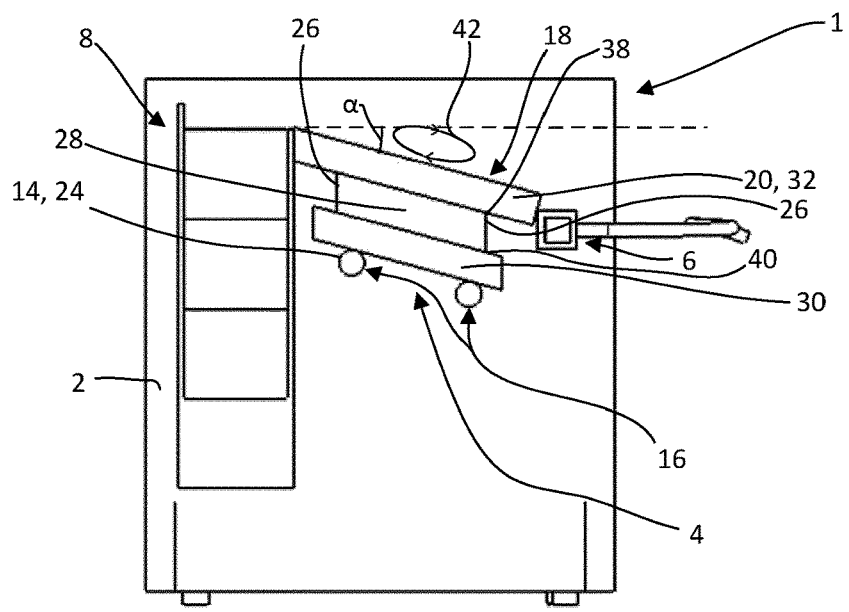
FIG. 2 schematically illustrates a side view of the screw feeder with the screw forwarding device according to FIG. 1.

Referring now to FIGS. 1 and 2, the screw forwarding device 4 comprises a vibration mechanism 18 and a fastening mechanism 16. The fastening mechanism 16 is used to connect the vibration mechanism 18 to the base plate 2 and comprises bolts, screws and nuts 24 that engage with pre-drilled holes 14 in the base plate 2. The fastening mechanism 16 may comprise another solution such as adapters, form-fit solutions and the like that connect the vibration mechanism 18 to the base plate 2. Alternatively, the vibration mechanism 18 may be directly welded or glued (not shown) to the base plate 2.

The vibration mechanism 18 comprises two plate springs 26, a vibration motor 28, a foundation 30 and a bridge 32. The foundation 30 is connected to the base plate 2 via the fastening mechanism 16 and the foundation 30 comprises adapters or the like to receive the bolts 24 of the fastening mechanism 16. The two plate springs 26 are connected to one another with their respective first ends 38 via the bridge 32, as best visible in FIG. 2. In FIG. 2 the rail 20 is also well visible and also the angle α, at which the rail is arranged versus a horizontal plane. The angle α is measured between the horizontal plane and a longitudinal axis of the rail 20. The angle α can have a value of 0 degrees, from 1 to 15 degrees, from 2 to 14 degrees or for instance 4, 5, 6, 7 or 8 degrees.

The screw forwarding device 4 further comprises a rail 20 that is connected to the bridge 32 of the vibration mechanism 18. The rail 20 is best visible in FIGS. 3 and 4 and it is used to convey screws with their threads downwards towards the separator unit 6. When the step feeder unit 8 moves the screws upwards towards the vibration mechanism 18, the screws are conveyed onto a plate that is vibrating, driven by the vibration mechanism 18, and from that plate the screws fall into the rail 20, where they are conveyed further by vibration to the separator unit 6. The separator unit 6 comprises a conveyor 44, which can be designed as a tube or pipe operated pneumatically for conveying the screws further to a tool. Other forms of conveyors 44 such as conveyor belts or (magnetic) rails may be used.

When the vibration motor 28 is activated, the vibration mechanism 18 defines a movement path 42 that is indicated in FIG. 2. The movement path 42 defines a circular—, an oval—or a round-rectangular path in a plane of movement, as indicated in FIG. 2. This movement path 42 leads to the conveying of the screws in the rail 20. The plane of movement is oriented orthogonal to the foundation 30 of the vibration mechanism and goes through the rail 20. The movement path 42 is in general defined by the orientation of the plate springs 26. These plate springs 26 are normally parallel to one another and inclined in order to generate a movement path in one direction, such as for example towards the right in FIG. 2. In the example illustrated in FIG. 2 the movement path 42 is also defined by the angle α. However, even if the angle α is 0 degrees the inclination of the plate springs 26 will lead to a forward movement of the screws towards the separator 6. Thus, the vibration unit 4 can forward the screws independent of the angle α. Typical frequencies of the vibration unit 4 are typical from 20 to 200 Hz, such as for example 50 Hz, such as for example 100 Hz or such as for example 120 Hz.

The base plate 2 is arranged at least more or less parallel to the plane of movement defined by the vibration mechanism 18. With at least more or less it is meant that the angle between the plane of movement and the base plate 2 is preferably 0° with a tolerance of +/−15°.

Using another definition, the base plate 2 and the plane of movement defined by the vibration mechanism 18 may be arranged vertical and parallel to one another, vertical and parallel with the same tolerance as stated above.

The fastening mechanism 16 is configured to arrange the vibration mechanism 18 comparably close to the base plate 2, so that the shortest distance between the base plate 2 and the vibration mechanism 16 is less than 3 cm. This comparably short distance is well illustrated in FIG. 3, where the base plate 2, the vibration mechanism 18 and the fastening mechanism 16 are visible.

Figure 3:
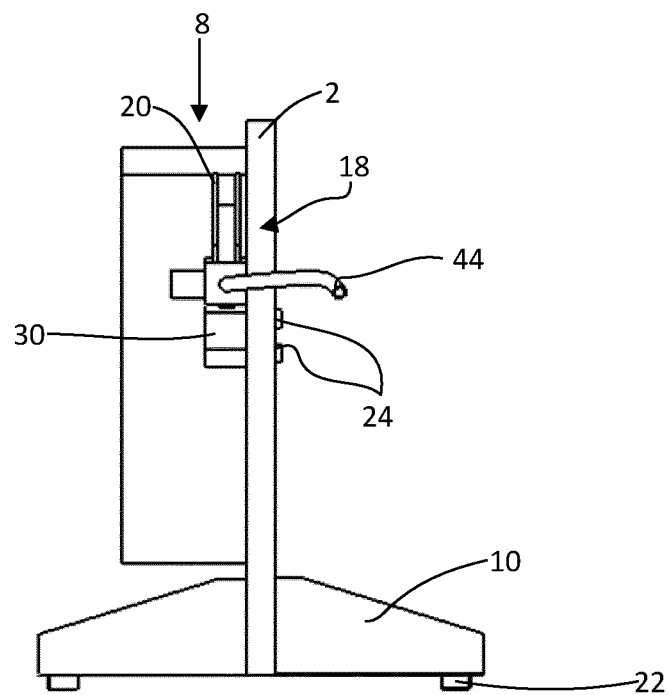
FIG. 3 schematically illustrates a front view of the screw feeder according to FIGS. 1 and 2.
Figure 4:
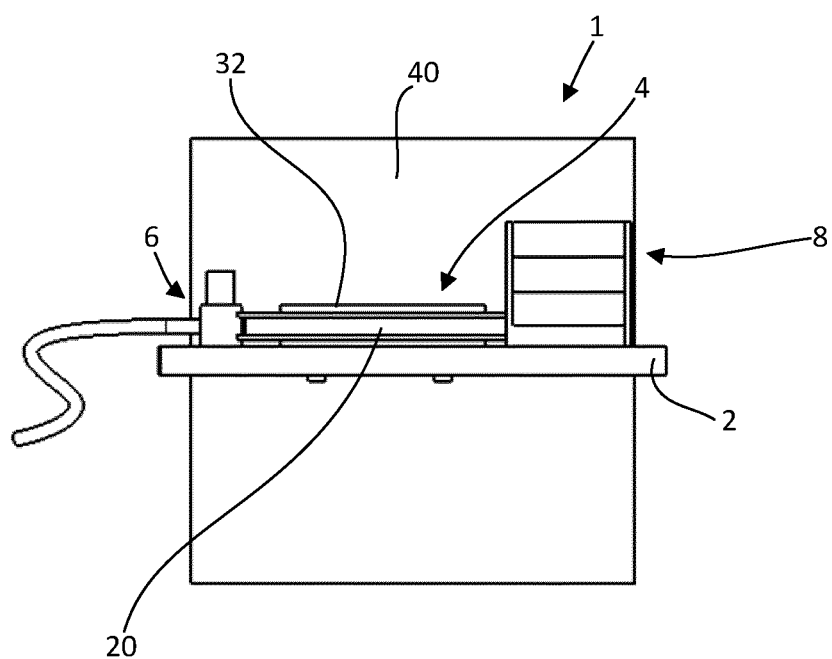
FIG. 4 schematically illustrates a top down view onto the screw feeder according to FIGS. 1 to 3.

For the sake of simplicity and also for understanding purposes, the separator unit 6 is not shown in FIG. 3. It is also clear from FIG. 3, how the cantilever arms 10 are extending from the base plate 2, namely in an at least more or less 90° angle versus the base plate 2, two cantilever arms on either side of the base plate 2.

With the above described build-up of the screw feeder 1, rubber cushions or absorber elements can be avoided, since the arrangement of the screw forwarding device 4 is chosen to be on the base plate 2, which is substantially parallel to the movement path 42. The vibration can further be dampened and eliminated by choosing a relationship between first mass of the vibration mechanism 18 and a second mass of the base plate 2 in a smart way of approximately: 1:4 to 1:18, preferably from 1:6 to 1:16 and more preferably from 1:8 to 1:10. Meaning that the second mass of the base plate 2 is at least four times heavier than the second mass of the vibration mechanism 18 but not more than eighteen times heavier.

The invention has now been described according to one embodiment. Modifications, which could be performed by the skilled person and within the general idea of the invention are herewith however also included in this document.

The invention claimed is:

1. A screw feeder comprising a base plate and a screw forwarding device rigidly mounted to the base plate, the screw forwarding device comprising a vibration mechanism comprising at least one spring and a vibration motor connected to the at least one spring, a rail for receiving screws, at least one fastener extending into the base plate and across the vertical plane in a direction transverse to the vertical plane to operatively couple the vibration mechanism to the base plate, the rail being connected to a first end of the at least one spring and a second end of the at least one spring being connected to the base plate via the at least one fastener, the at least one spring being arranged at an oblique angle to the rail, the vibration mechanism defining a movement path of the rail, when the vibration mechanism is in use, said movement path being arranged in and defining a plane of movement, wherein the base plate is oriented substantially parallel to the plane of movement defined by the vibration mechanism, wherein the plane of movement and the base plate are oriented substantially vertical, wherein the vibration mechanism has a first mass and the base plate has a second mass, and wherein the relation between the first mass and the second mass is from 1:6 to 1:15.

2. The screw feeder according to claim 1, wherein a shortest distance measured between the base plate and the vibration mechanism is less than 5 cm.

3. The screw feeder according to claim 2, wherein the shortest distance measured between the base plate and the vibration mechanism is smaller than 2 cm.

4. The screw feeder according to claim 1, wherein the second mass of the base plate is from 5 kg to 15 kg.

5. The screw feeder according to claim 4, wherein the second mass of the base plate is from 7 kg to 13 kg.

6. The screw feeder according to claim 5, wherein the second mass of the base plate is from 8 kg to 10 kg.

7. The screw feeder according to claim 1, further comprising at least two springs, a bridge and a foundation, wherein the bridge interconnects the at least two springs at their respective first ends and wherein the foundation interconnects the at least two springs at their respective second ends, and wherein the vibration motor is connected to any of the bridge or the at least two springs.

8. The screw feeder according to claim 1, wherein the at least one spring is a plate spring.

9. The screw feeder according to claim 1, wherein the base plate comprises pre-drilled holes or adapters and the at least one fastener comprises bolts, screws and nuts for securing the vibration mechanism to the base plate.

10. The screw feeder according to claim 1, wherein the relation between the first mass and the second mass is from 1:7 to 1:12.

11. The screw feeder according to claim 10, wherein the relation between the first mass and the second mass is from 1:8 to 1:10.

12. A screw feeder comprising a base plate and a screw forwarding device rigidly mounted to the base plate, the base plate defining a vertical plane, the screw forwarding device comprising a vibration mechanism comprising at least one spring and a vibration motor operatively coupled to the at least one spring, a rail for receiving screws, at least one fastener extending into the base plate and across the vertical plane in a direction transverse to the vertical plane to operatively couple the vibration mechanism to the base plate, the rail being coupled to a first end of the at least one spring and a second end of the at least one spring being coupled to the base plate via the at least one fastener, the at least one spring being arranged at an oblique angle to the rail, the vibration mechanism defining a movement path of the rail, when the vibration mechanism is in use, said movement path being arranged in and defining a plane of movement, wherein the base plate is oriented substantially parallel to the plane of movement defined by the vibration mechanism, wherein the plane of movement and the base plate are oriented substantially vertical, wherein the vibration mechanism has a first mass and the base plate has a second mass, and wherein the relation between the first mass and the second mass is from 1:6 to 1:15.

13. The screw feeder according to claim 12, wherein a shortest distance measured between the base plate and the vibration mechanism is less than 5 cm.

14. The screw feeder according to claim 13, wherein the shortest distance measured between the base plate and the vibration mechanism is smaller than 2 cm.

15. The screw feeder according to claim 12, wherein the second mass of the base plate is from 5 kg to 15 kg.

16. The screw feeder according to claim 15, wherein the second mass of the base plate is from 7 kg to 13 kg.

17. The screw feeder according to claim 12, further comprising at least two springs, a bridge and a foundation, wherein the bridge interconnects the at least two springs at their respective first ends, wherein the foundation interconnects the at least two springs at their respective second ends, and wherein the vibration motor is connected to any of the bridge or the at least two springs.

18. The screw feeder according to claim 12, wherein the at least one spring is a plate spring.

19. The screw feeder according to claim 12, wherein the base plate comprises pre-drilled holes or adapters and the at least one fastener comprises bolts, screws, and nuts for securing the vibration mechanism to the base plate.

20. The screw feeder according to claim 12, wherein the relation between the first mass and the second mass is from 1:7 to 1:12.

21. The screw feeder according to claim 20, wherein the relation between the first mass and the second mass is from 1:8 to 1:10.

* * * * *